Sept. 20, 1938.   W. DUBILIER   2,130,993
COLLAPSIBLE ROD
Filed Oct. 16, 1936   5 Sheets-Sheet 1
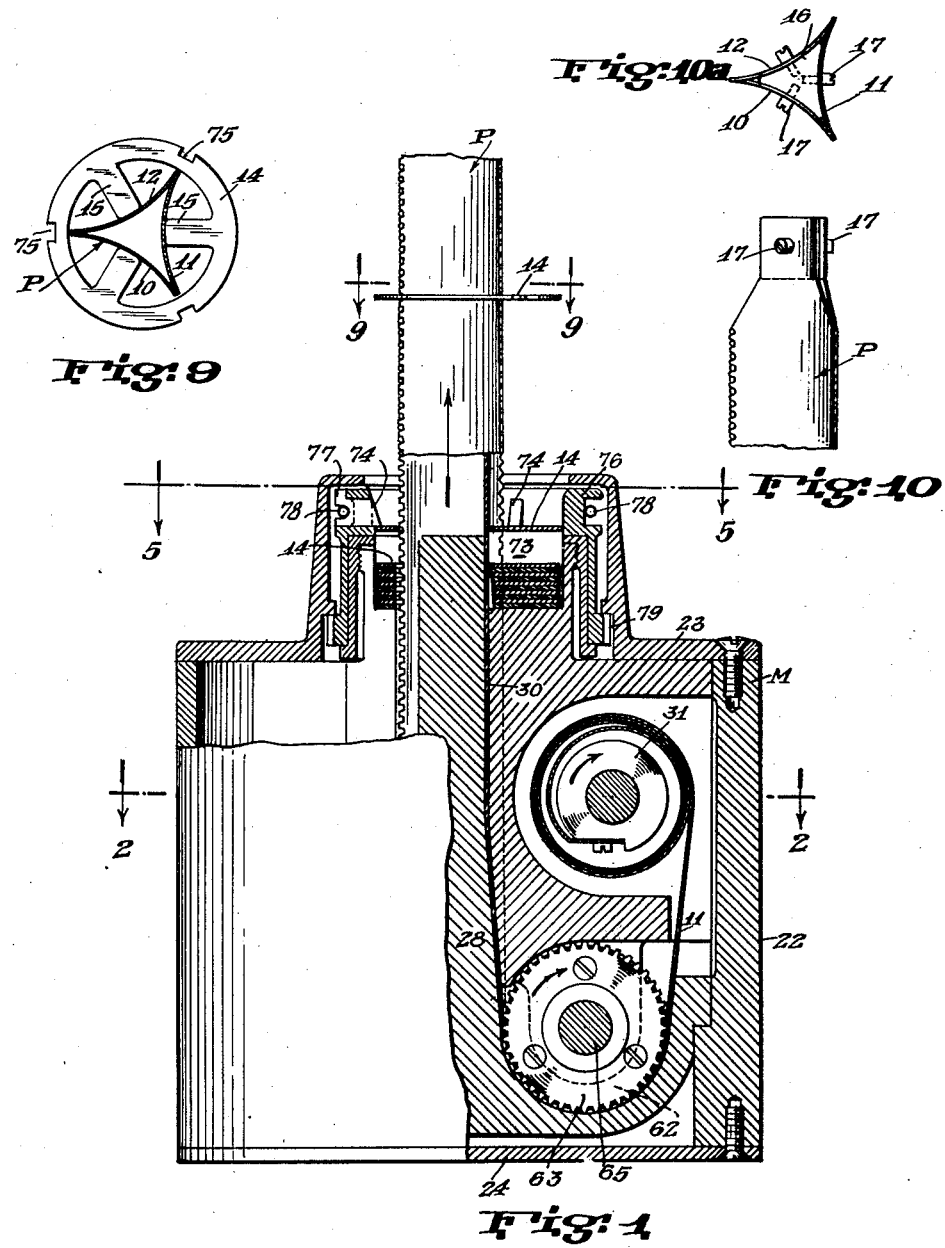
INVENTOR.
William Dubilier
BY
ATTORNEY.

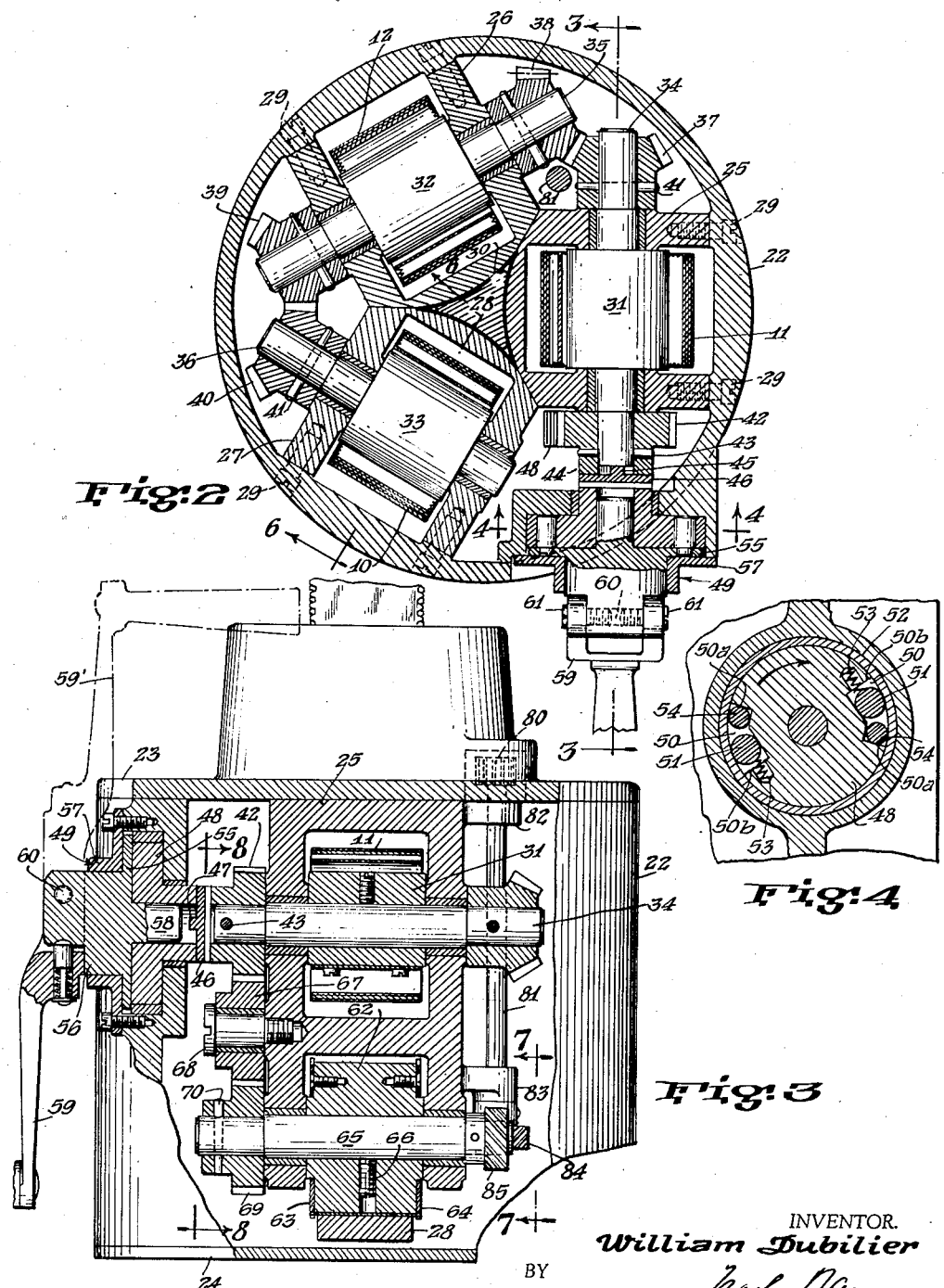

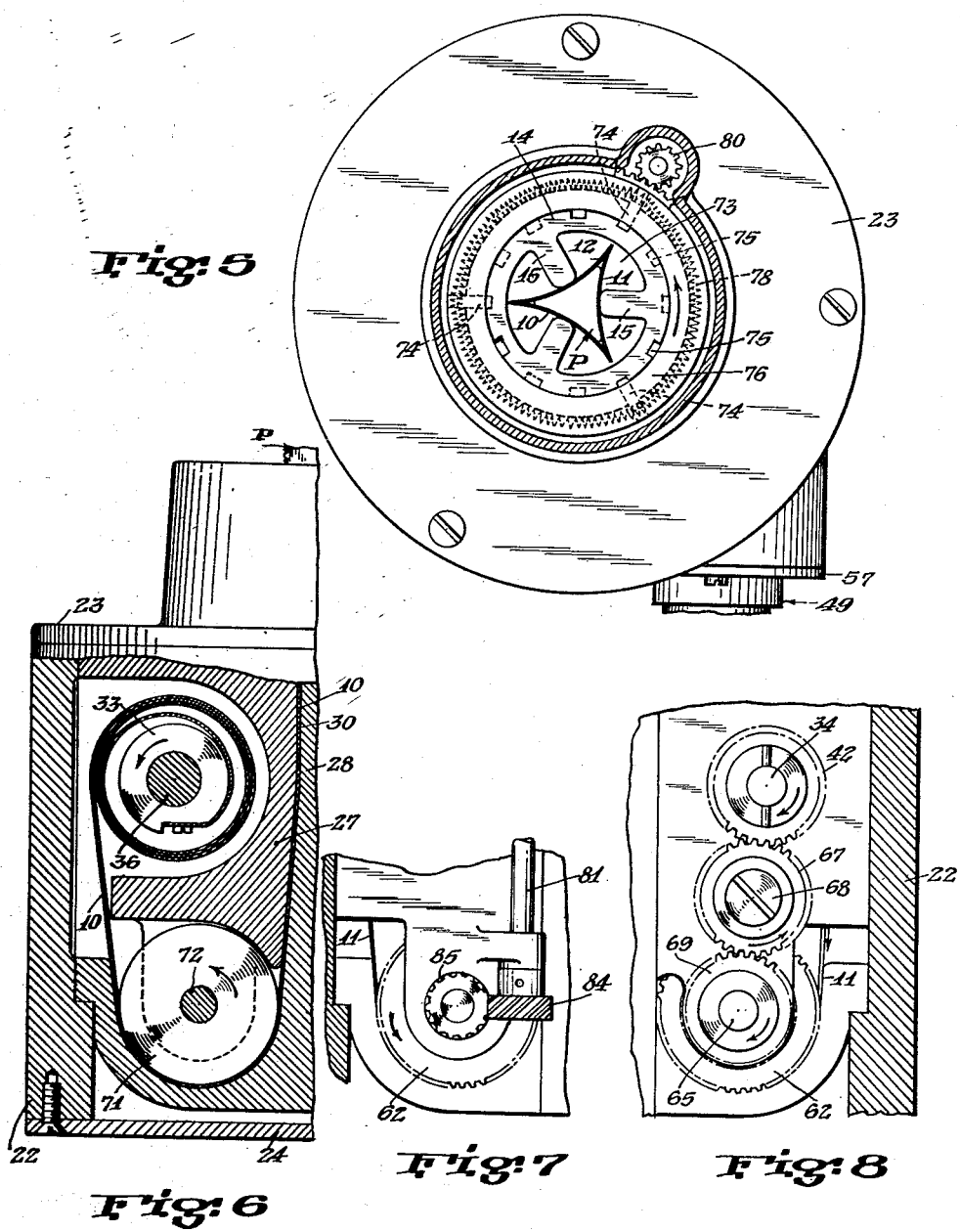

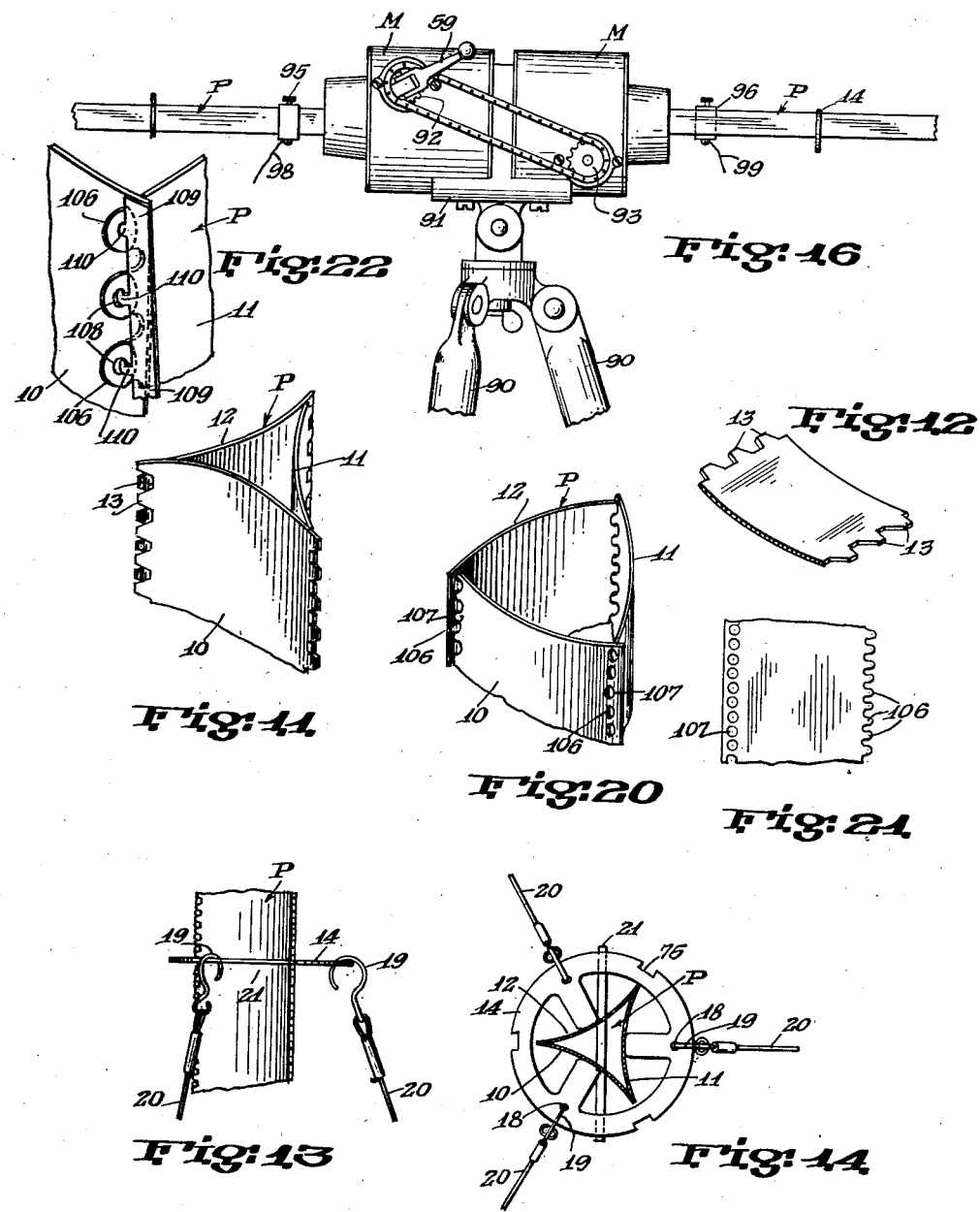

Sept. 20, 1938.  W. DUBILIER  2,130,993
COLLAPSIBLE ROD
Filed Oct. 16, 1936   5 Sheets-Sheet 5

INVENTOR.
William Dubilier
BY
ATTORNEY.

Patented Sept. 20, 1938

2,130,993

UNITED STATES PATENT OFFICE 2,130,993

COLLAPSIBLE ROD

William Dubilier, New Rochelle, N. Y.

Application October 16, 1936, Serial No. 105,944
In Great Britain July 2, 1936

18 Claims. (Cl. 189—14)

The present invention relates to collapsible structures, more particularly to extensible and collapsible rod structures or the like and has for its object to provide an improved form of structure of this type which normally occupies relatively small space and may be conveniently accommodated in a box or casing so that it is readily portable and yet can be extended to form a rigid, mechanically strong rod or pole suitable for various uses, such as wireless antenna, a ladder, fishing rod and the like.

The invention consists in the features of construction, combination of elements and arrangement of parts which will be exemplified in the construction hereinafter described, and which are illustrative of the improvements and novel features of the invention but which, as will become evident, are susceptible of numerous variations and modifications differing from the specific constructions and details shown and coming within the broad scope and spirit of the invention as defined in the appended claims.

The term rod is used herein to include any structure of equivalent type such as poles, masts, posts, or pillars, etc., which normally require comparatively large space for storing and are inconvenient to handle and transport.

In the accompanying drawings, Figure 1 is a front view partly in cross-section of a collapsible mast or rod structure shown during its erection.

Figure 2 is a horizontal cross-sectional view taken on line 2—2 of Figure 1.

Figure 3 is a cross-section taken on line 3—3 of Figure 2.

Figure 4 is a partial sectional view taken on line 4—4 of Figure 2.

Figure 5 is a cross-section taken on line 5—5 of Figure 1.

Figure 6 is a partial section taken on line 6—6 of Figure 2.

Figure 7 is a partial view taken on line 7—7 of Figure 3.

Figure 8 is a partial view taken on line 8—8 of Figure 3.

Figure 9 is a section through the rod taken on line 9—9 of Figure 1.

Figures 10 and 10a are plan and cross-sectional views showing the upper end of the rod.

Figure 11 is a perspective view showing the construction of the rod.

Figure 12 is a fractional view showing one of the tape members of which the rod is composed.

Figures 13 and 14 are partial plan and sectional views showing features of construction for supporting the rod or mast by guy wires.

Figures 15 and 16 illustrate diagrammatically a portable, collapsible antenna for wireless apparatus constructed in accordance with the invention.

Figure 17 is a diagram illustrating the invention as embodied in a collapsible radio antenna built in a motor car for transportable wireless stations.

Figures 18 and 19 illustrate diagrammatically the utilization of a structure according to the invention as a collapsible ladder.

Figures 20 and 21 illustrate an alternative construction of tape members forming the elements of the collapsible rod.

Figure 22 illustrates a further multiplication for connecting and locking the tapes forming the rod according to the invention.

Similar reference characters identify similar parts throughout the different views of the drawings.

Figure 47:
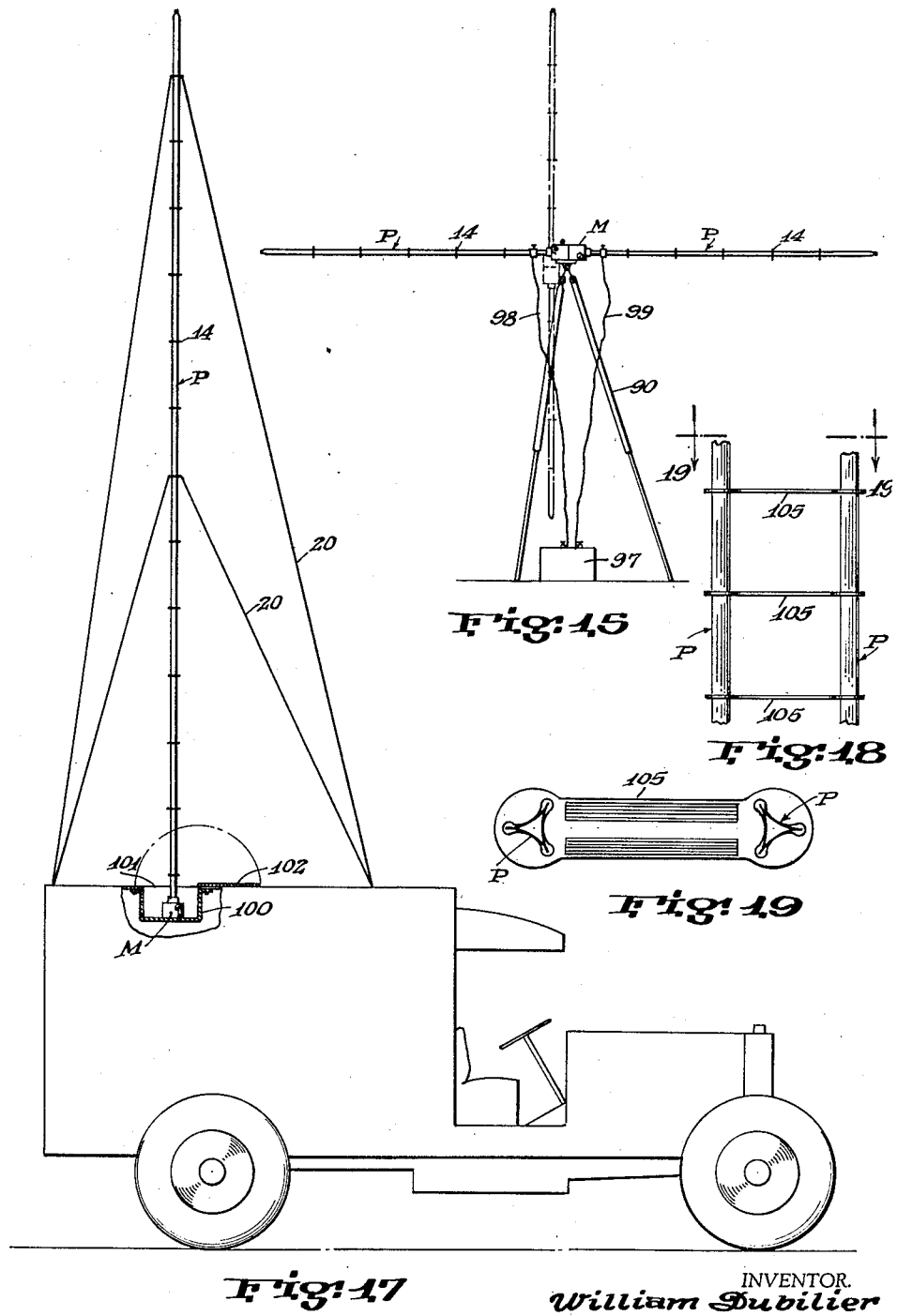

The improved extensible rod according to this invention comprises three or more tapes or strips of a flexible springy material, such as spring steel, each capable of being wound into a roll, arranged to form a hollow rod with each tape constituting one side or wall of the rod and means whereby the engaging sides of adjacent tapes can be held together when the rod is extended but can be released to permit collapse of the rod. Preferably the tapes are of the type having a curved or concavo-convex cross-section or camber so as to be substantially rigid when extended.

In a preferred construction the several tapes are mounted in a common holder having chambers to receive the several wound tape rolls and provided with openings or exit guides through which the tapes are drawn or fed when the rod is extended and collapsed. Means may be provided for feeding the several tapes from the holder simultaneously, such means preferably comprising sprocket wheels the teeth of which engage in sprocket holes in the tapes.

The engaging edges of the tapes may be held together at spaced intervals by clips which may be of slotted form and, when a common holder is provided, the clips are preferably arranged so that they are engaged by the tapes automatically at spaced intervals as the tapes are drawn or fed from the holder. Alternatively the edges of the tapes may be so shaped and/or formed that the engaging edges of adjacent tapes interlock either automatically as the tapes are fed from the holder or can readily be locked together by means of a suitable device applied to such edges. Thus, for example, the edges of the tapes may be provided with teeth and/or slots which interengage when the edges are held together by any suitable form of clip or other device or the teeth or slots may be formed, for example, sloped and/or notched so that the engaging edges interlock rigidly with one another after the manner of the well known flexible interlocking slidingclasp type fastener or one edge of each tape may be turned inwardly or otherwise formed with longitudinal slots or grooves to receive the edge of the adjacent tape, rings closely encircling the rod, or other means being provided to retain this edge in position in the slot or groove.

Referring more particularly to Figures 1-3, the device shown consists of two main elements: A collapsible rod or pole P and an erecting mechanism M which has the triple function of erecting the rod P, forming its supporting base, and storing it within, in compact form, when not in use.

The rod P, Figures 11 and 12, consists of a structure composed of three substantially identical flexible metal tapes 10, 11, 12 of suitable material such as spring steel having a curved transverse or concavo-convex form uniform throughout their whole length so that the tapes have an inherent tendency to assume a rectilinear state to increase their individual stiffness. These tapes are disposed with respect to each other to form, when the rod is erected, a hollow cylinder of triangular cross-section, the convex sides of the tapes, in the example shown, being turned inwards while their edges rest in contact upon those of the adjacent tapes.

Rod P may be considered as a composite structural member subject, principally to direct axial and flexural loadings, such as, the rod's own weight, wind pressure, etc. But whatever the nature of these loadings, the main stresses developed within the structure will resolve themselves into longitudinal or axial tension and compression, which the individual tapes or composing elements must resist safely. In analogy with an ordinary beam subject to flexure, however, there will exist a longitudinal shear (the so-called "horizontal shear" of beams) due to the non-uniform distribution of longitudinal stresses, which, in the case of the composite structure under description, will manifest itself as a tendency of the individual tapes axially to slide upon each other. In order to prevent failure of the structure due to this tendency, sliding is eliminated by the provision of teeth 13 along the edges of the tapes, which mesh with the teeth of the adjacent tapes, as the rod is being erected.

Due to longitudinal compressive stresses, the individual tapes will tend to buckle and separate from each other, and, to avoid this, rings 14 shown in greater detail in Figure 9, are provided along the structure, which are held in place by the friction caused by pressure of the radial protrusions 15 of the rings against the elastically yielding walls of the tapes, and are spaced from each other sufficiently close to insure safe lateral support.

In the construction shown in the drawings each individual tape under compression may be considered as a column in the adequate distribution of the rings along the rod. Thus, when the rod, in its normal function, is subject to bending and compressive forces due to wind pressure and the rod's own weight, the compressive stresses will increase from zero at the top to a maximum at the base, and the rings, in order to have the least number of them, should be spaced more widely apart toward the top or free end. The correct spacing of the rings may be determined according to a suitable rule as, for example, an adaptation of Euler's column formula.

The three tapes are joined permanently together at the free end by means of block 16 and screws 17, as shown in Figures 10 and 10a. When it is necessary to add to the safety of the post, guy wires may be attached to it, and, for this purpose, some of the rings are adapted to receive these guy wires, as by the provision of holes 18, as shown in Figures 13 and 14, into which the terminal hooks 19 of the guy wires 20 are inserted. In order that the rings carrying the guy wires stay in place against the downward component of the pull of the wires, pins 21, inserted in prelocated perforations in the tapes, may be employed for the rings to rest on. Alternatively, the tapes themselves may be provided with holes into which the terminal hooks 19 of the guy wires are inserted in which case the pins 21 can be dispensed with.

The mechanism M is completely enclosed within a housing 22 having top and bottom covers 23, 24 as shown in Figures 1-3. Items 25, 26, 27 are frames carrying the drums to be described presently, and together with the central frame 28, are securely fastened to the walls of housing 22 by means of screws shown at 29. The frames 25, 26, 27, 28 constitute together a snug passage at 30 for the three tapes to pass through suitable guides and provide lateral support for the rod. The tapes forming the rod are individually loosely wound and fastened with screws on upper drums 31, 32, 33 all rigidly mounted, and rotatable therewith, on shafts 34, 35, 36 journaled in bushed holes in the respective frames 25, 26, 27. The three shafts 34, 35, 36 carry at their ends bevel gears 37, 38, 39, 40 fixed thereto by means of tapered pins 41, or other suitable means, these gears being provided to transmit motion to shafts 35 and 36 from shaft 34.

Shaft 34 carries at the end opposite to bevel 37, a spur gear 42, keyed thereto by means of tapered pin 43. Hub extension 44 of spur 42 has a slot 45 to receive one of the tongues of the floating member 46 of an Oldham coupling. The opposite tongue of this floating member engages a slot 47 in hub extension of drum 48 of friction ratchet 49. This friction ratchet, constructed on the principle of the conventional over-running clutch, serve to lock the erecting mechanism against the effects of the weight of rod P. It consists of the drum 48 already mentioned (see Fig. 4); provided with milled-out portions 50 which latter are formed with flat faces on which rollers 51 ride, which, together with hardened lining 52 forced into bore in housing 22, produce a wedging effect when drum 48 tends, due to the weight of the rod, to rotate in a direction opposite to that of the arrow. To initiate this wedging effect, springs 53, acting against rollers 51, are provided. Within the milled-out portions 50 there are further provided pins 54, rigidly riveted into the flange of disc 55, and which serve to function as follows:

By rotating the disc 55 in a clockwise direction by turning operating handle 59 when erecting the rod, pins 54 will push against radial surfaces 50a in drum 48 thereby forcing 48 to rotate in the same direction, the wedging effect of the rollers being broken up automatically; while rotating 55 in the counterclockwise direction to collapse the rod by turning the handle 59 in the opposite direction, pins 54 will push rollers 51 against springs 53, thus releasing the wedging of the rollers, and then against radial surfaces 50b, thereby imparting rotation to the drum 48 in the same direction.

The disc 55 has an extension 56 which serves as a journal free to turn in bearing extension of cover 57, which acts also as a retainer for 55. Another extension 58 of disc 55, which projects into bore in 48, is provided to secure a better bearing for 55 and prevent wobbling. A handle 59 is provided to impart rotation to disc 55. This handle is pivoted at 60 on screws 61, so that it may be turned upward as shown by the dot-and-dash outline 59', thus putting it out of the way when not in use.

Tape 11 is passed over drum 62, having toothed end-plates 63, 64 securely attached thereto and which in turn is securely mounted upon shaft 65, as by means of a set screw 66. Shaft 65 derives its motion from spur gear 42, through idler spur gear 67 arranged to rotate freely on pin 68, and through spur gear 69, securely attached to shaft 65 as by tapered pin 70, (see Fig. 8). With this gearing arrangement drums 31 and 62 will rotate in the same direction. The teeth 13 of tape 11 mesh with the teeth of end-plates 63, 64, whereby the tape is propelled by the drum 62. Tape 10 is passed over idler drum 71 arranged to rotate freely on shaft 72, as shown in Fig. 6. Tape 12 is passed over another idler drum similar to 71. As the tapes 10, 11, 12 leave their respective lower drums, when the rod is being erected, their edges will come in contact and their teeth will intermesh with those of the opposite tapes.

As the tapes continue their motion upward, they will pick up rings 14, which are released one at a time. For this purpose, the rings are all piled up in a recess 73, Figure 1, before the erection of the rod. The lengths of the protrusions 15 of the rings are graded so as to have those of the upper rings press against the elastic walls of the rod more firmly than those of the lower rings, to make sure that the uppermost ring remaining in recess 73 will be carried up by friction by the post whenever the three uniformly rotating pawls 74 register with notches 75, Figures 5 and 9, of the rings. The notches 75 of adjacent rings are non-coincident, so that, when the upper ring is released as the pawls register with its notches, the lower rings will be held down by the pawls, and the rings released individually. Furthermore, the notches 75 are located with respect to the whole group of rings in such a way, that the release of the rings by the uniformly rotating pawls is timed according to what manner of distribution of the rings along the post is desired. The uniformly rotating pawls 74 are carried around by the sleeve 76, each one being inserted in apertures in this sleeve where, within certain limits, they are free to move radially. The pawls are normally held against stops 77 by the force of the garter spring 78. Sleeve 76 has at the lower edge a gear crown 79 whose teeth mesh with those of a pinion 80, Figures 3 and 5. Pinion 80 is keyed at upper end of shaft 81, which is journaled in bearings 82, 83 of frame 25. The lower end of shaft 81 has keyed thereon a helical gear 84, which meshes with helical gear 85 keyed at one end of shaft 65.

With this gearing arrangement the motion of sleeve 76 and, consequently, the motion of pawls 74, will be synchronized with the motion of the propelling drum 62. When the rod is collapsed or reeled-in, the notches of the rings will again register with the pawls and the rings piled up in recess 74, provided the rings have remained in the same place they were assigned to when the rod was erected. As the rings may have moved slightly out of their original places, due to vibration, etc., their notches might not register with the pawls as they are brought down, the result being that they will have a tendency to pile up above the pawls. If they do pile up above the pawls, then, as the rod is reeled in its entirety, the heads of screws 17 at the free end of the rod will eventually come in contact with the protrusions 15 of the uppermost ring, forcing all those rings remaining above the pawls into recess 74 as the beveled pawls spread out against the garter spring force due to the reaction of the outside edges of the rings against the beveled portions of the pawls.

As will readily be appreciated the improved construction of extensible rod or pole according to this invention has many uses. Thus for example it can be employed as a portable aerial or antenna for wireless transmitting and receiving apparatus. For use in short wave apparatus, a substantially rigid and straight aerial rod having a length of, say, about fifteen feet can be obtained when using three spring steel tapes having widths of about an inch to an inch and a half. Such a wireless aerial can readily be withdrawn or extended as required and when not in use occupies only a very small space since the dimensions of the complete holder are of the order of a four inch cube. If desired the holder can be pivotally mounted on trunnions carried by a base which can be mounted, say, on a suitable insulating support. The angle of inclination of the rod can thus be readily adjusted to obtain directional effects. An extensible antenna of this construction is thus extremely portable and is particularly suitable, for example, for wireless transmitters or receivers used on motor cars to be described hereafter.

The device may also be employed as a portable di-pole antenna for ultra-short wave apparatus, in which case two units are mounted together on a tripod 90 having a swiveling platform 91, Figures 15 and 16, the two units being related mechanically to each other by means of sprockets 92, 93 and chain 94, so that the two antenna rods may be erected simultaneously by turning a single handle. The swiveling platform permits the di-pole antenna to be oriented in any desired position. Platform 91, as well as sprockets 92, 93, may be made of suitable electrically insulating material so that the two antenna rods will remain electrically insulated from each other. Clamps 95, 96 are attached to posts to permit electrical connections with transmitter or receiver 97 by means of leads 98, 99. The device may also be employed as a single antenna of larger dimension for medium or short wave stations, illustrated as a permanent fixture of a radio station automobile in Figure 17. In the latter, the device M is shown mounted on a bracket 100 suspended from the roof of the automobile body, the post being allowed to pass through opening 101 provided with trap door 102.

Besides the use as collapsible antennae for transportable wireless stations, the collapsible rod structure according to the invention is advantageously suited for the construction of a collapsible ladder in which case somewhat larger tapes will usually be required than are necessary for a wireless aerial. It is found however that an extremely rigid rod sufficiently strong to support the weight of a climber can be made with three tapes having widths of the order of four inches. When so employed the tapes are preferably provided with slots by means of which step irons or other members of any suitable form can be fixed to the rod when extended or the slots may themselves constitute the steps of the ladder. These slots may be additional to slots provided, as described above, for the sprocket wheels used for feeding the tapes from the holder or the slots engaged by the teeth of the sprocket wheels may be used, when the ladder is extended, to support step irons or other members. If desired, the ladder, instead of consisting of one rod provided with step irons or the equivalent, may be built up of two or more of such rods with appropriate cross or lattice members attached thereto after the rods have been extended. Thus, for example, the ladder may consist of two extensible rods spaced apart and connected by transverse members which constitute the steps or may be built up of three, four or more of such rods connected by suitable transverse lattice members so as to form a rigid tower-like structure, as shown diagrammatically in Figures 18 and 19.

In the latter, two identical structures of the type disclosed are mounted on a common support or in a casing and provided with means for simultaneous erection such as by a common drive similar as shown and described by Figure 16. Corresponding rings 14 of the two separate structures are connected together by members 105 serving as the steps of the ladder which may be held by the locking pins 21 or in any other convenient manner.

It is to be understood that the above description is by way of example only and that many modifications may be made within the scope of the invention. Thus for example, whilst in the construction described above, the rod is formed by tapes of curved cross-section, it will be appreciated that flat tapes may be used although the rod formed thereby will probably not be as strong as a rod formed with curved tapes of the same dimensions.

Furthermore, the rings 14 may be dispensed with and the tapes prevented from buckling or disengaging by having one edge thereof formed with teeth or lips 106 similar to the teeth 13 and by providing perforations 107 along the opposite edge of the tape in such a manner that when the rod is erected the teeth of one tape engage the perforations of the adjacent tape in the manner of the known slide fastening devices, thus ensuring a rigid self-supporting structure requiring no additional holding or locking means as shown in Figures 20 and 21.

Alternatively, a separate locking device such as a chain or tape 109 (see Fig. 22) may be provided which may be of substantially smaller width than the main tapes 10, 11 and 12 and is applied to the main tapes as the latter are unwound. For this purpose, the teeth 106 of one tape engaging the holes 107 of the adjacent tape are shown provided with perforations 108 engaged by the hook-like extensions 110 of the auxiliary tape 109. The auxiliary tapes may be stored, and wound and unwound in synchronism with the main tapes by the provision of suitable gear transmission devices as will be readily understood. In order to facilitate the locking operation, the tapes are preferably arranged to approach each other at a slight angle as indicated in the drawings in such a manner that the extensions 110 readily enter into and lock with the perforations 108.

I claim:

1. A collapsible rod comprising a plurality of resilient metal tapes each arranged to be wound into a roll, said tapes forming a hollow cylinder with each tape constituting one side of the cylinder, a plurality of discrete supporting members spaced at predetermined intervals along said rod for holding together the engaging sides of the adjacent tapes, means for winding and unwinding said tapes in unison, and further means cooperating with said last means for simultaneously releasing and applying said supporting members, whereby said rod may be collapsed and extended.

2. A collapsible rod comprising a plurality of concavo-convex resilient metal tapes each arranged to be wound into a roll, said tapes forming a hollow cylinder with each tape constituting one side of the cylinder, a plurality of discrete supporting members spaced at predetermined intervals along said rod for holding together the engaging sides of adjacent tapes, means for winding and unwinding said tapes in unison, and further means cooperating with said last mentioned means for simultaneously releasing and applying said supporting members, whereby said rod may be collapsed and extended.

3. A collapsible rod comprising a plurality of resilient metal tapes each arranged to be wound into a roll and having longitudinal toothed edges, said tapes forming a hollow cylinder with the teeth of one tape engaging the teeth of the adjacent tape, a plurality of discrete supporting members spaced at intervals along said rod for holding together the engaging sides of adjacent tapes, means for winding and unwinding said tapes in unison, and further means cooperating with said last means for simultaneously releasing and applying said supporting members, whereby said rod may be collapsed and extended.

4. A hollow rod structure comprising a plurality of concavo-convex resilient metal tapes, said tapes being arranged with their convex edge portions engaging each other to form a hollow cylinder, and a plurality of discrete annular supporting elements spaced at predetermined distances apart and having inner radial extensions frictionally engaging the faces of said tapes to form a rigid structure.

5. A hollow rod structure comprising a plurality of concavo-convex resilient metal tapes, said tapes being arranged with their edges engaging each other to form a hollow cylinder with the convex sides of the tapes turned inwardly, and a plurality of discrete ring-shaped elements surrounding said cylinder at spaced predetermined intervals, said elements having inner radial extensions frictionally engaging and holding said tapes together.

6. A hollow rod structure comprising a plurality of concavo-convex resilient metal tapes, said tapes having toothed longitudinal edges and arranged to form a hollow cylindrical rod with the teeth of one tape engaging the teeth of the adjacent tape, and a plurality of discrete ring-shaped supporting elements encircling said rod at predetermined spaced intervals, said elements having inner radial extensions each frictionally engaging one of said tapes to hold adjacent tapes in firm engagement.

7. A hollow rod structure comprising a plurality of concavo-convex resilient metal tapes, said tapes having toothed longitudinal edges and arranged to form a hollow cylindrical rod with the teeth of one tape engaging the teeth of the adjacent tape, the convex side of the tapes being turned inwardly, and a plurality of discrete ring-shaped supporting elements encircling said rod at predetermined spaced intervals, said elements having inner radial extensions frictionally engaging the sides of said tapes to hold adjacent tapes in firm engagement.

8. A hollow rod comprising three concavo-convex resilient metal tapes, said tapes having toothed edges and arranged to form a hollow cylindrical rod with the teeth of one tape engaging the teeth of the adjacent tape, the convex sides of said tape being turned inwardly, and a plurality of discrete ring-shaped supporting elements encircling said rod at predetermined spaced intervals, said elements having inner extensions frictionally engaging the outer surface of said tapes so as to hold adjacent edges of said tapes in firm engagement.

9. A collapsible rod structure comprising a casing, a plurality of resilient metal tapes capable of being wound into a roll, a plurality of winding drums rotatably mounted in said casing, each of said tapes being adapted to be wound upon and unwound from one of said drums, drive means for rotating said drums in unison, propelling means for unwinding said tapes from and rewinding the same upon the respective drums, further means for guiding the tapes into marginal engagement to form a hollow cylindrical rod upon emerging from said casing during unwinding, and a plurality of supporting elements frictionally engaging said rod at spaced intervals to hold the sides thereof in firm engagement, said elements being normally stored in said casing, and means actuated from said drive means for applying and releasing said elements in prearranged order as said rod is extended and collapsed, respectively.

10. A collapsible rod structure comprising a casing, a plurality of resilient metal tapes capable of being wound into a roll, a plurality of winding drums rotatably mounted in said casing, each of said tapes being adapted to be wound upon and unwound from one of said drums, drive means for rotating said drums in unison, propelling means for unwinding said tapes from and rewinding the same upon the respective drums, means for guiding the tapes into marginal engagement to form a hollow cylindrical rod upon emerging from said casing during unwinding, and a plurality of ring-shaped supporting elements normally piled upon each other within said casing, said elements having inner radial extensions adapted to frictionally engage the sides of said rod to hold the sides thereof in firm engagement, and a rotating pawl operated from said drive means, said pawl overlapping said elements and being adapted to engage non-coincident radial slots in said elements, whereby said elements are released and picked up by the rod in prearranged sequence when said rod is being extended.

11. A collapsible rod structure comprising a casing, a plurality of winding drums rotatably mounted in said casing, a plurality of resilient metal tapes having toothed edges each of said tapes being adapted to be wound upon and unwound from one of said drums, drive means for rotating said drums in unison, means for guiding the tapes whereby the teeth of one tape engage the teeth of the adjacent tape to form a hollow cylindrical rod upon emerging from said casing during unwinding of the tapes, and a plurality of discrete holding members encircling said rod at predetermined spaced intervals, said holding members frictionally engaging said tapes to hold the same in firm engagement, and means actuated from said drive means for applying and releasing said holding members in prearranged order as said rod is extended and collapsed, respectively.

12. A collapsible rod structure comprising a casing, a plurality of winding drums rotatably mounted in said casing, a plurality of resilient metal tapes having toothed longitudinal edges, each of said tapes being adapted to be wound upon and unwound from one of said drums, drive means for rotating said drums in unison, means for guiding the tapes whereby the teeth of one tape engage the teeth of the engaging tape to form a hollow cylindrical rod upon emerging from said casing during unwinding with said tapes forming the sides of said rod, and a plurality of ring-shaped supporting elements normally stored and piled upon each other within said casing, said elements being adapted to frictionally engage the outer sides of said rod to hold said tapes in firm engagement, and means operated in synchronism from said drive means for releasing said elements to be frictionally engaged by the sides of said rod at predetermined spaced intervals while said rod is being extended.

13. A collapsible rod structure comprising a casing, three winding drums rotatably mounted in said casing, three concavo-convex resilient metal tapes capable of being flattened and wound into a roll and having toothed edges, each of said tapes being adapted to be wound upon and unwound from one of said drums, drive means for rotating said drums in unison, and means for guiding the tapes whereby the teeth of one tape engage the teeth of the adjacent tape to form a hollow cylindrical rod with the convex side of the tapes turned inwardly upon emerging from said casing while said tapes are being unwound, and a plurality of discrete holding members encircling said rod at predetermined spaced intervals, said holding members frictionally engaging said tapes to hold the same in firm engagement, and means actuated from said drive means for applying and releasing said holding members in prearranged order as said rod is extended and collapsed, respectively.

14. A collapsible rod structure comprising a casing, three winding drums rotatably mounted in said casing, three concavo-convex resilient metal tapes capable of being flattened and wound into a roll and having toothed longitudinal edges, each of said tapes being adapted to be wound upon and unwound from one of said drums, drive means for rotating said drums in unison, means for guiding said tapes whereby the teeth of one tape engage the teeth of an adjacent tape to form a hollow cylindrical rod upon emerging from said casing during unwinding, and a plurality of annular elements adapted to frictionally engage the sides of said rod at spaced intervals, said elements being normally piled upon each other and stored within said casing, and means operated in synchronism with said drive means for releasing said elements in predetermined sequence while said tapes are being unwound.

15. A hollow rod structure comprising three concavo-convex resilient metal tapes having toothed longitudinal edges, said tape being arranged with the teeth of one tape engaging the teeth of the adjacent tape to form a hollow cylinder with the convex sides of the tapes turned inwardly, and a plurality of discrete annular supporting elements spaced at predetermined distances apart and having inner radial extensions frictionally engaging the faces of said tapes to form a rigid structure.

16. A hollow rod structure comprising three resilient concavo-convex metal tapes, each of said tapes having its longitudinal edges formed with a series of teeth, said tapes being arranged with the teeth of one tape engaging the teeth of the adjacent tape to form a hollow cylinder with the tapes having their convex sides turned inwardly and constituting the sides of said cylinder, and a plurality of discrete holding members encircling said cylinder at predetermined intervals and engaging said tapes to hold said tapes in firm engagement.

17. A collapsible rod structure comprising a casing, a plurality of winding drums rotatably mounted in said casing, a plurality of resilient metal tapes having toothed longitudinal edges, each of said tapes being adapted to be wound upon and unwound from one of said drums, drive means for rotating said drums in unison, means for guiding said tapes whereby the teeth of one tape engage the teeth of an adjacent tape to form a hollow cylindrical rod upon emerging from said casing while the tapes are being unwound, and a plurality of ring-shaped elements normally stored and piled upon each other within said casing, said elements being adapted to frictionally engage the outer sides of said rod to hold adjacent tapes in firm engagement, and means operated in synchronism with said drive means for releasing and engaging said elements with said rod at predetermined spaced intervals when said rod is being extended.

18. In a collapsible structure as claimed in claim 9 including means for preventing collapse of said rod due to its own weight.

WILLIAM DUBILIER.